United States Patent [19]
Slinger

[11] Patent Number: 6,043,910
[45] Date of Patent: Mar. 28, 2000

[54] MULTIPLE ACTIVE COMPUTER GENERATED HOLOGRAM

[75] Inventor: Christopher W Slinger, Malvern, United Kingdom

[73] Assignee: The Secretary of State for Defence in Her Britannic Majesty's Government of the United Kingdom of Great Britain and Northern Ireland, Farnborough, United Kingdom

[21] Appl. No.: 09/125,387
[22] PCT Filed: May 16, 1997
[86] PCT No.: PCT/GB97/01346
    § 371 Date: Aug. 18, 1998
    § 102(e) Date: Aug. 18, 1998
[87] PCT Pub. No.: WO97/45774
    PCT Pub. Date: Dec. 4, 1997

[30] Foreign Application Priority Data

May 30, 1996 [GB] United Kingdom .................... 9611278

[51] Int. Cl.[7] ...................................... G03H 1/02
[52] U.S. Cl. .................. 359/3; 359/7; 359/9; 349/201
[58] Field of Search ................ 349/201, 20, 21; 359/3, 7, 95, 79, 9, 87, 15, 72, 573, 575; 430/1

[56] References Cited

U.S. PATENT DOCUMENTS

| 3,623,786 | 11/1971 | Dammann . |
| 3,651,488 | 3/1972 | Amodei . |
| 3,932,025 | 1/1976 | Lakatos et al. . |
| 5,130,830 | 7/1992 | Fukushima et al. ...................... 359/72 |
| 5,198,912 | 3/1993 | Ingwall et al. .............................. 359/3 |
| 5,198,920 | 3/1993 | Gobeli et al. . |

*Primary Examiner*—Cassandra Spyrou
*Assistant Examiner*—Craig Curtis
*Attorney, Agent, or Firm*—Nixon & Vanderhye P.C.

[57] ABSTRACT

Apparatus which allows selection and generation of a variety of hologrammatic optical wavefronts. A device, which comprises a substrate layer of varying thickness and an electro optic layer, with a voltage dependent refractive index mismatch between the two, is used to modulate transmitted light, thus generating a hologrammatic wavefront. Said modulation can be changed by variation of an applied voltage and this changes the wavefront which is generated. The range of wavefronts which can be generated is defined by the distribution of substrate layer thicknesses across the device.

6 Claims, 8 Drawing Sheets

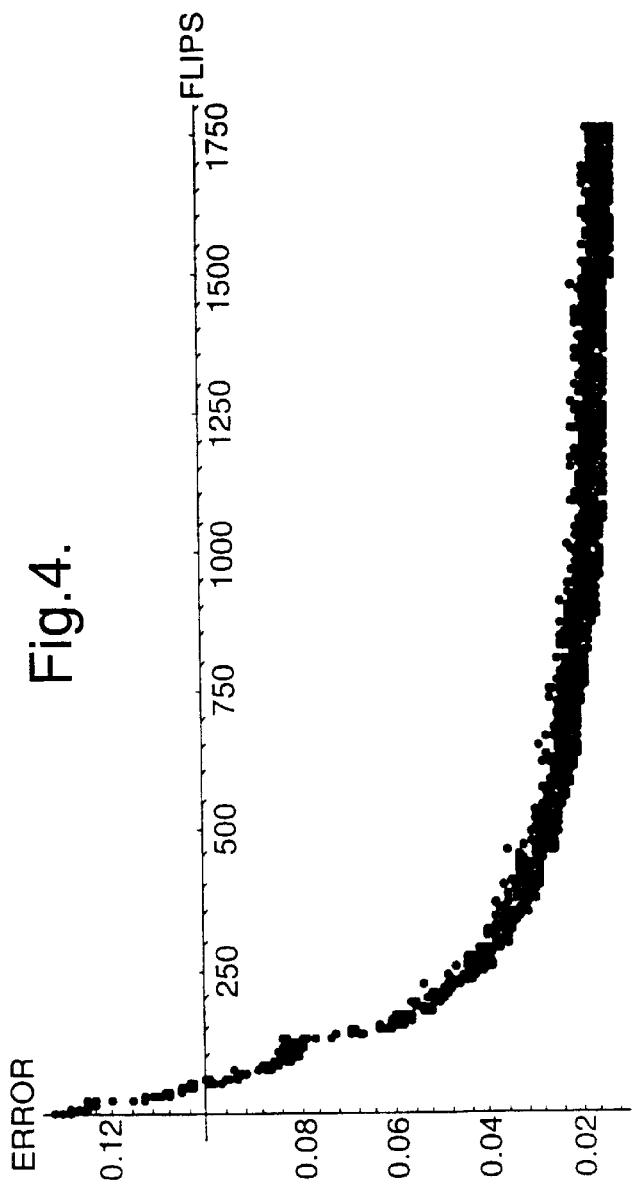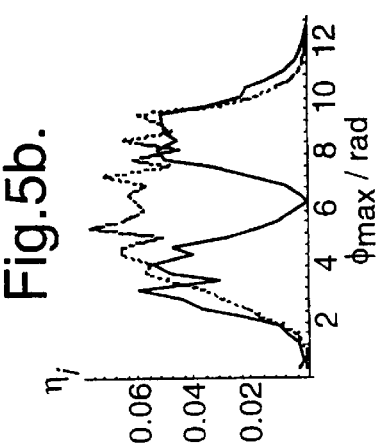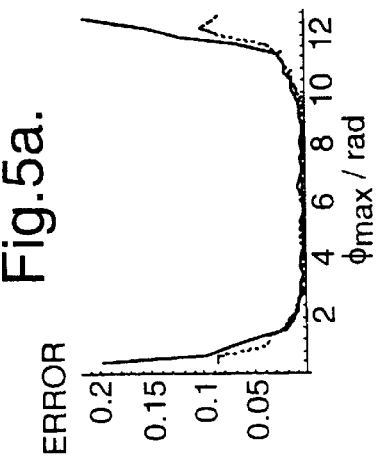

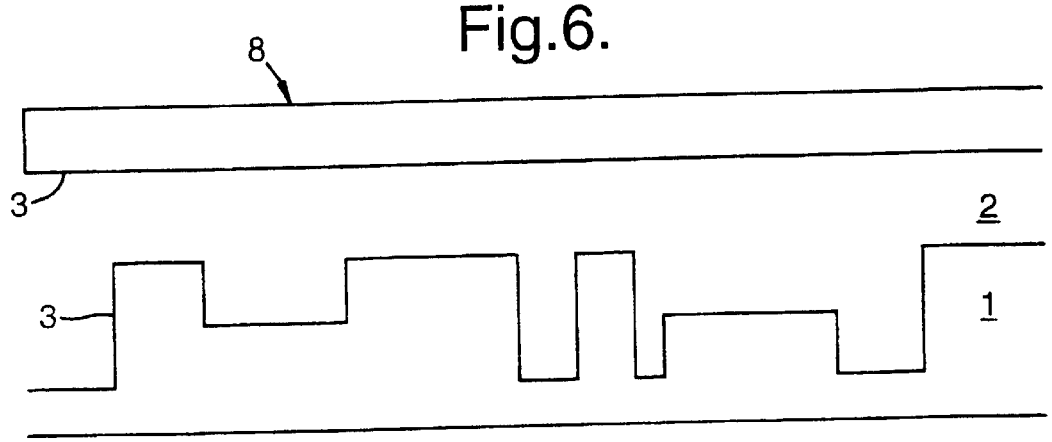
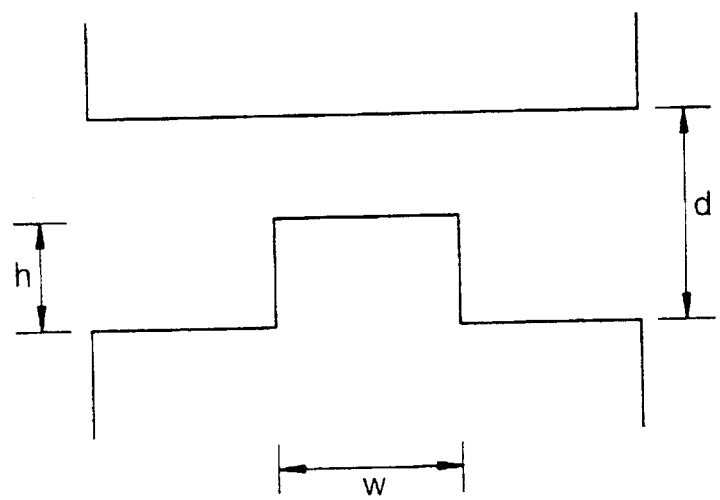

Fig. 13.
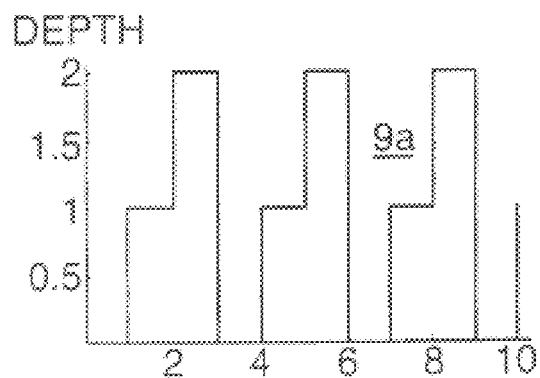
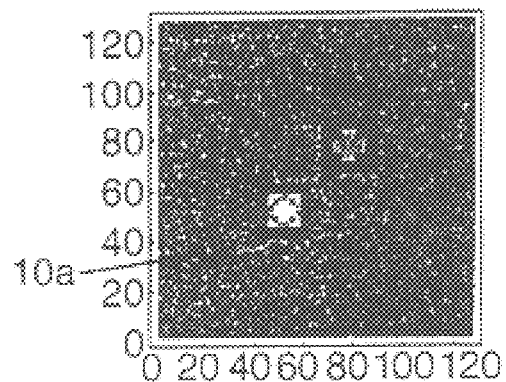
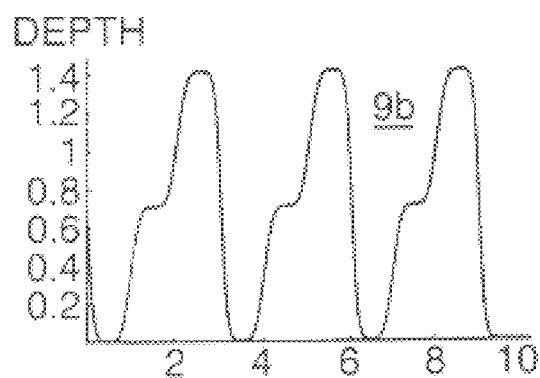
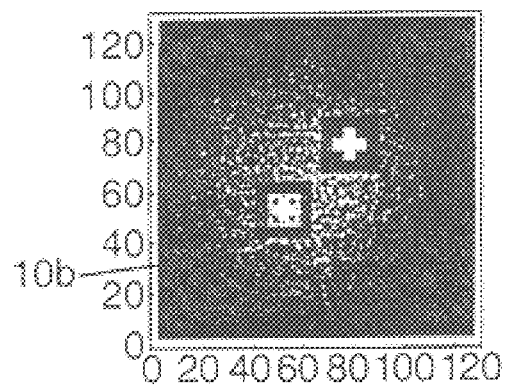
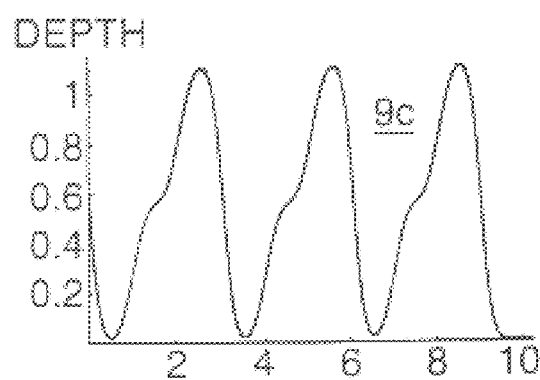
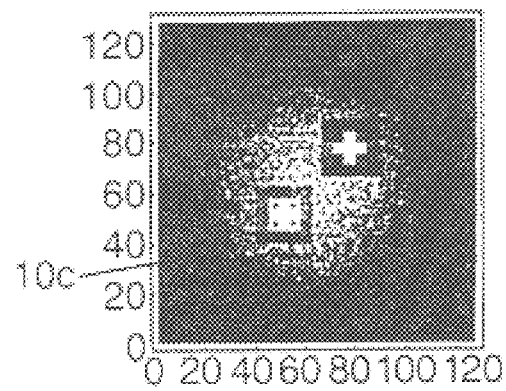
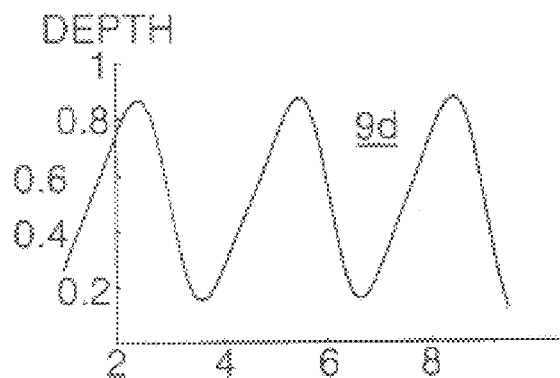
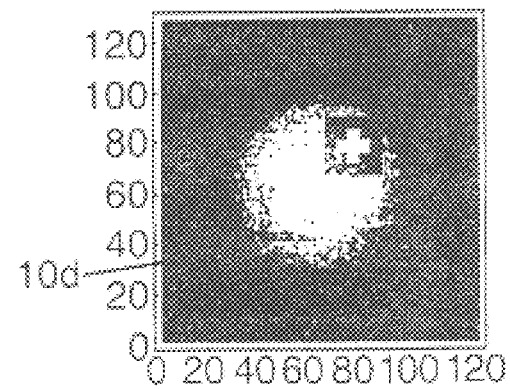

MULTIPLE ACTIVE COMPUTER GENERATED HOLOGRAM

BACKGROUND OF THE INVENTION

1. Field of the Invention

The current invention is concerned with the controllable generation of multiple optical wavefronts and, for convenience, will be referred to as an active hologram. It has applications in areas such as (for example) three dimensional displays of information, optical interconnects, beam steering, optical pattern recognition, wavefront synthesis and shaping, and diffractive optical elements.

2. Discussion of Prior Art

Computer Generated Holograms (CGH) are a powerful method for generating almost arbitrary optical wavefronts. They represent a generalisation of the conventional hologram (themselves, a powerful technique with potential use in many optical systems). In the latter, however, the wavefront to be stored in the hologram must be realised by some means during the writing of the hologram. In CGH, this restriction does not apply. All that is needed is a mathematical description of the required wavefront. Subsequent calculations determine the structure of the CGH, which can then be fabricated by a variety of techniques.

Typically a CGH is a two dimensional, rectilinear array. Each element (or pixel) of this array has a given optical transmission $t_{ij}$, where $t_{ij}$ can be either real (an absorption modulated CGH) or imaginary (a phase modulated CGH) or a combination of both. Examples of absorption CGH include ones fabricated from photographic film or patterned into chrome on glass. Phase modulated CGH are often made by etching into a transparent substrate, to produce a surface relief pattern.

Using holographic analogies, it is clear that CGH can perform general wavefront transformations. As such, they are a key, enabling technology for many optical systems, particularly optical processing and interconnects.

Switchable diffraction gratings are also known. They rely on the principle of matching the refractive index of some electro optic material (e.g. a nematic liquid crystal) with a transparent substrate. When a voltage is applied across the whole device (through two transparent electrodes on the input and output faces, say) the refractive index of the electro optic material changes accordingly. Consequently there is now an index mismatch, and the light passing through the device will be diffracted at the boundary between the substrate and the electro optic material. The larger the applied voltage, the greater the index mismatch.

Spatial Light Modulators (SLM) are also known (see for example OPTICS LETTERS, Vol. 11. No. 11 November 1986 pp 748–750; ELECTRONICS LETTERS Vol. 28 No. 1, 2 January 1992, pp 26–28). Typically, such a device would comprise an array of pixels each of which has can impart an optical phase modulation of one of two magnitudes (one of which would typically be zero) depending on the voltage applied to that pixel. In order to produce a desired wave front, appropriate voltages are applied to each pixel. Under appropriate computer control, a large number of CGH can be implemented on the SLM. These devices are however, complex, expensive, unreliable and require complex drive circuitry (for example each pixel has to be addressed individually). They require significant computer systems if several CGH are required to be rapidly implemented. Additionally, pixel sizes and counts are limited.

SUMMARY OF THE INVENTION

According to this invention an active hologram for generating a plurality of wavefronts comprises at least two layers of material capable of modulating radiation, means for applying a plurality of voltages to said layers and means for illuminating said layers with radiation, wherein said layers include an electro optic layer, having an index of refraction which changes with applied voltage so that the modulation imparted to illuminating radiation passing through any point on the hologram varies with applied voltage and a substrate layer, having a surface profile defined by its thickness varying across the hologram so that the modulation imparted to illuminating radiation at a given applied voltage varies across the hologram, the profile of said substrate layer being arranged so as to define the wavefronts generated at each of said plurality of applied voltages upon illumination by a given wavefront.

In a preferred embodiment of the electro optic layer is a nematic liquid crystal.

The substrate layer may comprise an array of pixels of varying thickness, arranged to produce the required surface profile. These pixels may be integral in a single substrate sheet having a surface profile which varies according to the substrate layer thickness associated with each pixel.

Typically the means for applying a plurality of voltages to the pixels comprises at least two electrodes arranged to facilitate application of said voltages across at least the nematic liquid crystal layer of each pixel. Each of the electrodes might be formed from, for example, indium tin oxide or aluminium.

The apparatus might include means for effecting an optical transformation on light which has been phase modulated by the array of pixels. This could be a lens used to effect a Fourier or Fresnel transform.

BRIEF DESCRIPTION OF THE DRAWINGS

The invention will now be described, by way of example only, with reference following figures in which:

FIG. 4 shows data describing the evolution of the quality of a device of the current invention during design using an iterative technique;

FIGS. 5a and 5b respectively show the variation of error and of efficiency with a parameter describing the phase shift per unit depth at each pixel of a device of the current invention;

FIG. 6 shows an alternative electrode arrangement which might be employed in the current invention;

FIG. 7 shows the geometry, of a theoretical device used to model the behaviour of liquid crystal material used in a specific embodiment of the invention;

FIG. 12 shows the outputs obtained at two different voltages from a design of a device of the current invention and FIG. 13 shows how the optical output of the device of FIG. 12 deteriorates as the substrate profile degrades and deviates from the design profile.

DETAILED DESCRIPTION OF PREFERRED EMBODIMENTS

Throughout this specification, the term light is intended to be construed in a broad sense and nothing therein should be taken as limited to the visible region of the electromagnetic spectrum. In particular, the underlying principles of the current invention are equally applicable in other regions of the spectrum for example in the infrared region and "optical" systems should be taken to include systems operating in this region.

Figure 1A:
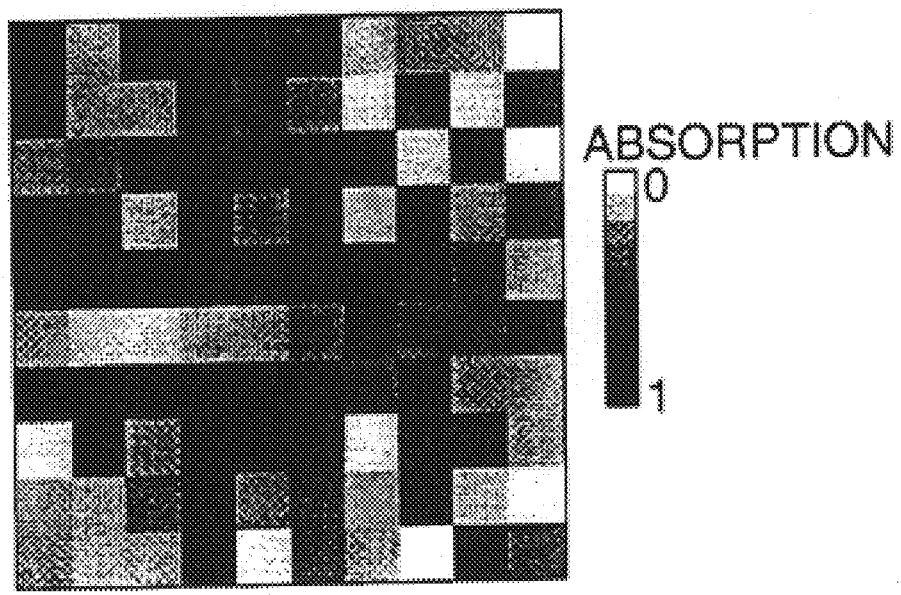
FIGS. 1a and 1b show examples of absorption and phase modulated computer generated holograms respectively.
Figure 1B:
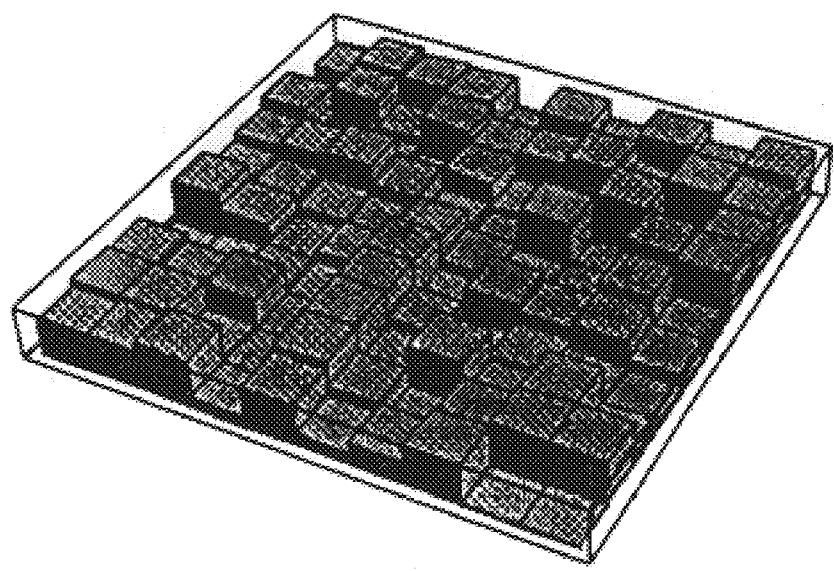

An absorption modulated CGH may be generated using an array of pixels (FIG. 1a) each of which has a fixed transmission of light. A phase modulated CGH may be generated using an array of pixels (FIG. 1b) each of which imparts a fixed phase shift on transmitted light (by virtue of its fixed optical path length). During operation of either of these devices, the array is subject to illumination by a wavefront and light passing through the array emerges as a wavefront which is dependent on the pattern of transmission or phase modulating pixels.

These devices have the disadvantage that, once the array of modulating pixels is fabricated, the wave front which can be produced is fixed for a given input wavefront.

Figure 2:
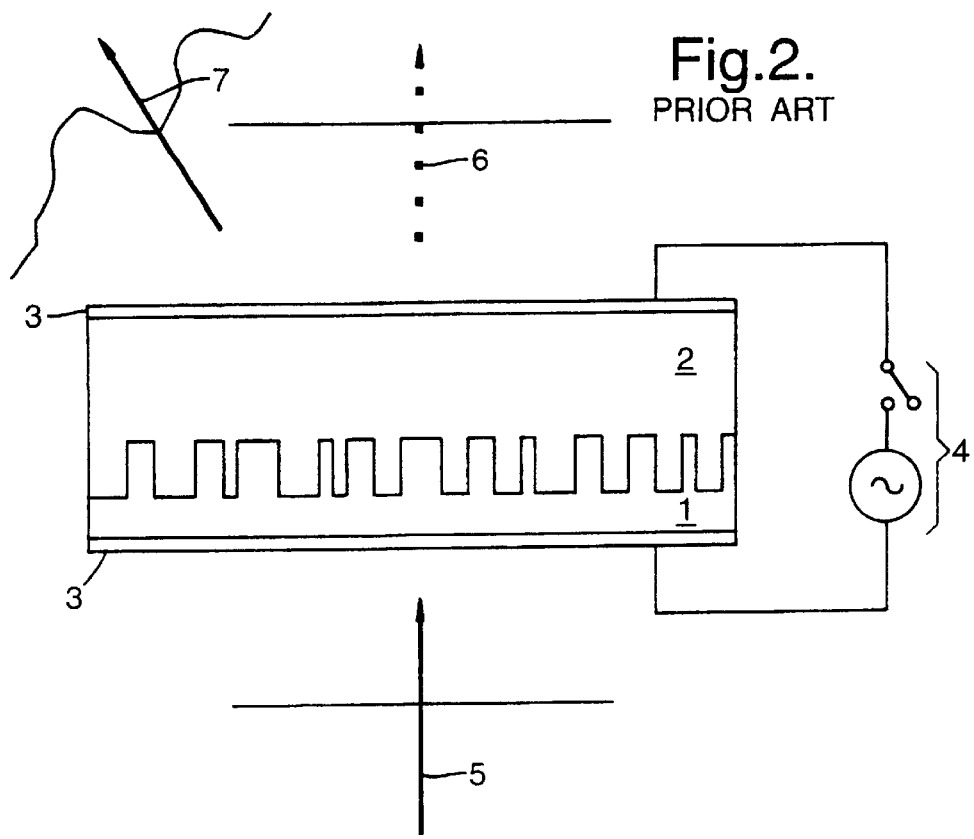
FIG. 2 shows a schematic of a simple CGH.

Referring to FIG. 2, a typical CGH might comprise a layer of transparent substrate material 1, of variable thickness, and a layer of electro optic material 2 (e.g. a nematic liquid crystal), sandwiched between two transparent electrodes 3. Means 4 for applying a voltage to electrodes 3 is also provided.

Electro optic material 2 is selected so that, (say) with no voltage applied across electrodes 3 its refractive index matches that of substrate 1 and incoming light 5 emerges undiffracted 6. On application of an electric field the refractive index of the electro optic material 2 changes causing a mismatch with that of substrate 1. Incoming light 5 is now diffracted 7.

Typically such a device only offers a choice of two states which are determined at fabrication.

Figure 3:
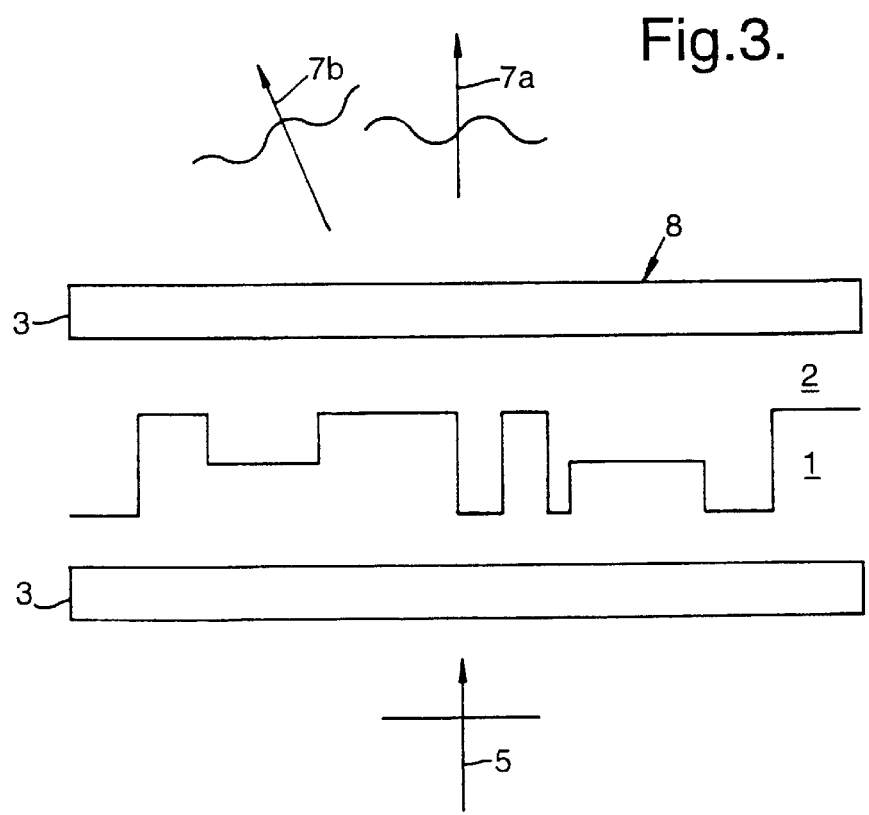
FIG. 3 shows a schematic of the current invention.

Referring to FIG. 3, a typical device 8 of the current invention includes a layer of substrate material 1 having a variable thickness, a layer of electro optic material 2 and a pair of electrodes 3. In this example thickness of the substrate layer is quantized, the layer comprising an array of pixels each with an associated thickness. This is reflected in the profile of the interface between layers 1 and 2. The pixels are integral in single layer 1. Means for applying a variable voltage to electrodes 3 is also supplied (not shown).

The substrate may be formed using techniques which are well known to those skilled in the art, for example reactive ion etching. As an alternative to the quantized thicknesses shown, the thickness could be continuously variable.

During operation the device is illuminated with incoming radiation 5 and imparts an optical modulation thereto which depends on the voltage which is applied to the device. The optical modulation imparted to light passing through a particular point on the hologram depends on the thickness of substrate 1 at that point.

The information defining the wavefronts 7a, 7b which emerge at given applied voltages, for a given illuminating wavefront is contained in the surface profile of the substrate. Such a substrate may be formed by techniques which are well known to those skilled in the art (for example reactive ion etching.

The emerging wavefronts 7a, 7b may then be subjected to further optical transforms (e.g. Fourier or Fresnel.

The current invention relies on the design of a substrate which will give specified wavefronts at specific applied voltages. An example of how this might be achieved is given below.

Different pixels in the array give rise to different phase modulation by virtue of their different thicknesses. For ease of optimisation and implementation, the allowable depths of this profile are quantised into $0,1,2,3, \ldots n_{levels}-1$. Assume that the phase change of a light wave passing through the ijth pixel, of substrate depth $d_{ij}$, is $\phi_{ij}$. Due to the electro-optic material in which the substrate is immersed, $\phi_{ij}$ will vary with the voltage applied across the whole device. The task is to determine $d_{ij}$, such that this variation in $\phi_{ij}$ produces the desired wavefronts at the output of the optical system. This is a nonlinear optimisation problem.

One of the simplest algorithms derived to produce optimised solutions to this problem, direct n search (where n is equal to $n_{levels}$), is described briefly below. Parameters in the problem include the number of pixels ($m_1 \times m_2$) in the array, the maximum phase change allowed for each pixel $\phi_{max}$, and the number of wavefronts (or patterns) to be stored and recalled ($n_{patterns}$).

After starting with an $m_1 \times m_2$ array of random substrate depths $d_{ij}$ ($0 \leq d_{ij} \leq n_{level}-1$), a randomly chosen pixel has its depth increased by one unit. If the resulting $d_{ij}$ is greater than ($n_{level}-1$)then $d_{ij}$ is set to zero. The output is then measured for applied voltages of $V=0,1,2,3, \ldots, n_{patterns}$ and some error measure e is calculated and recorded as $e_0$. e is derived by comparing the output of the optical system containing the array (typically the intensity of the Fourier or Fresnel transformed transmittance of the array) to the associated desired output at each value of V.

Next the process is repeated at another random pixel and the new error e derived and compared to $e_0$. If it is smaller than $e_0$, then the new value is stored in its place and the process continued. However, if the new error is larger than $e_0$, the pixel is restored to its previous depth and the next random pixel chosen before continuing the process. FIG. 4 shows how the size of the error varies for a two level Fourier array.

In this way, the array substrate profile 'evolves' to give a set of outputs close to those desired. Initially the error e decreases quickly, but soon slows. The process is continued until no further improvement is found. The set of depth values is then used as a basis for implementing the array of pixels. Note that the above procedure finds a good solution, not necessarily the best—i.e. a local optimum is determined. Generally this will not be as good as the global optimum. More sophisticated techniques can give better solutions (e.g. incorporation of simulated annealing or genetic algorithms), at the expense of greater computational effort.

The algorithm described above is but one example of several which may be used and relies on the allowable thicknesses associated with each pixel to be quantised. Continuous level substrates are also possible and these can be designed using a technique based on projections onto constrained sets (POCS).

An important consideration in array design is the 'complexity' of the device i.e. how the device performance varies with the number of pixels, the number of levels $n_{levels}$ and the number and form of the desired wavefronts to be stored. Related issues are the computational complexity of the optimisation problem in determining the substrate profile and the ease of fabrication of the device. Table 1 summarises the trade-offs involved.

TABLE 1

Summary of Effects of Array Complexity.

|  | optimisation difficulty | error e | performance (fidelity) | fabrication difficulty |
|---|---|---|---|---|
| low pixel count | low | high | low | low |
| high pixel count | high | low | high | high |
| low number of levels | depends on choice of optimisation algorithm | high | low | low |
| high number of levels | depends on choice of optimisation algorithm | low | high | very high |

One way of quantifying this complexity, or information content, is the space bandwidth product (SBWP). This can be defined as:

$$SBWP = m^2 \log_2(n_{levels}) \quad \text{Equation 1}$$

As might be expected, the higher the SBWP, the better the array performance, but the harder it is to design and fabricate (as can be seen in Table 1). Using similar arguments, it is clear that, for uncorrelated output wavefronts.

$$e \approx \frac{SBWP}{n_{patterns}} \quad \text{Equation 2}$$

i.e. the more wavefronts the device is required store and generate, the higher the errors found.

One of the design parameters so far undiscussed is $\phi_{max}$—defined as the phase shift per unit depth of substrate at each pixel, at the maximum applied voltage $V_{max}$. Intuitively, one might expect $\phi_{max}$ to strongly affect the amount of light diffracted into the desired wavefront (i.e. the efficiency, $\eta$), and the size of the error e. In most applications it might be desirable, for recall of the ith wavefront, that both $\eta_i$ and $e_i$ should be similar to those of the other wavefronts stored in the device. $\phi_{max}$ will also strongly affect device fabrication, large values requiring a material with a stronger electro-optic effect, deeper profiles, and/or higher applied voltages, together with possibly slower switching times—for a liquid crystal, switching speed (cell thickness)$^{-2}$.

A reasonable goal in choosing $\phi_{max}$ might then be to use the lowest value giving an acceptable error and similar efficiencies for all the stored patterns. As an example, consider an array designed for generation of 2 wavefronts.

FIG. 5a shows the variation of errors $e_i$ and FIG. 5b shows the variation of efficiencies $\eta_1$ for each of the two wavefronts, as a function of $\phi_{max}$. Wavefront 1 (output at $V=v_0$) and 2 ($V=2v_0$) results correspond to the dashed and solid curves respectively.

From these plots, it is clear that a good value to choose for a design would be $\phi_{max} \approx 4.1$ radians. This figure is confirmed by analytical calculations.

The previous description relates to an idealised version of the current invention. Whilst showing some of the features, further considerations are needed when implementing the design in practice.

Choice of Electro-Optic Material

The magnitude of the optimum $\phi_{max}$ indicates that a material with a high electro-optic coefficient is required, in order to minimise the depths necessary in the array substrate. Fabrication problems become more prevalent as SBWP increases and the pixel sizes become smaller. The higher the aspect ratio (defined as pixel depth/width), the more difficult it is to generate such profiles accurately.

Liquid crystals are an excellent choice for the electro-optic medium. Their mode of operation and high birefringence (~0.2) enables practical, low voltage (~10 V) devices to be fabricated. Moreover, they are widely available and have excellent transmission properties.

Electrode Arrangements

In the arrangement shown in FIG. 3. electrodes 3 sandwich substrate layer 1 and electro optic material 2. FIG. 6 shows an alternative arrangement in which one of the electrodes 3 is located along the interface between layers 1 and 2.

Of the two arrangements shown in FIGS. 3 and 6, the former has proved more difficult to design.

With the latter, three combinations of electrode materials were examined, namely:—

Configuration 1. both electrodes of transparent, electrically conducting material, (e.g. indium tin oxide);

Configuration 2. upper electrode transparent and conducting, lower electrode reflecting, electrically conducting material, (e.g. aluminium) and Configuration 3. upper electrode reflecting and conducting, lower electrode transparent and conducting.

Choice of configuration used will depend very much on application. Of those presented above, Configuration 1 was selected for the production of a working example of the invention.

Liquid Crystal Effects

The effect of the feature size in the surface relief structure on the liquid crystal alignment and the non-uniform voltage profile in the device will now be considered. There are three main liquid crystal related design parameters which may have implications for the successful operation of the device. These are: the method chosen to impart liquid crystal alignment over the relief structure on the surface, the refractive index properties of the liquid crystal material in the device, and the effect of fringing fields from the corners of the relief structure on the liquid crystal switching characteristics.

To gain an insight into the first effect, a finite element model has been developed which allows a liquid crystal director field to be calculated for a given device structure. This model is described below. To model the switching of the liquid crystal material in a field is a more complex problem. A discussion of this problem is given in later.

Alignment Issues and Finite-Element Modelling.

The model is used to assess the effect of the substrate surface relief in the array on the bulk alignment of the liquid crystal. A simple geometry has been adopted for the initial studies and this is shown in FIG. 7. The device is taken to be a cell of height d which is filled with a nematic liquid crystal material (NLC). The effect of the surface relief structure is simply modelled by having a rectangular outcrop from the lower surface of height h and width w. The current model is two dimensional and will give predictions about the NLC bulk alignment for sections through the surface features.

The direction of average alignment of the molecules in a NLC at a given point is described by a vector n called the director. The symmetry of a NLC dictates that the direction n and the antiparallel direction are entirely equivalent so n≡−n. The usual way to give an alignment direction to the NLC at a surface is with a polymer that has been rubbed by a spinning cloth on a mechanical roller. This defines a preferred direction of the director on the surface and often a small pretilt angle relative to the surface of a few degrees.

Typically for a NLC device the cell thickness is of the order d=$10^{-5}$m, in order to give enough phase depth. The example of the current invention fabricated has feature sizes such that w=25∓m and h=1.5∓m. In this case the features have a low aspect ratio. This means that conventional rubbing techniques can be applied and any alignment problems caused by the rubbing at the edge of the structures will be over a minimal fraction of the device. However, in future devices the requirement to increase the information content of the holograms will mean that the pixel size is greatly reduced. In the current model cases are therefore considered where the outcrops of the relief structure have a high aspect ratio, taking up an appreciable depth in the device and are of a width w which is comparable and of less than the cell spacing d.

Deformations of the director field in an NLC are described mathematically using continuum theory (see for example "Liquid Crystals" by Chandrasekhar, published by Cambridge University Press, ISBN 0-521-41747-3). There are three possible characteristic deformations: splay, twist and bend. These deformations are described by the following free energy density:

$$2W_d = K_{11}(\nabla \cdot n)^2 + K_{22}(n \cdot \nabla \wedge n)^2 + K_{33}(n \wedge \nabla \wedge n)^2 \quad \text{Equation 5.}$$

where $K_{11}$, $K_{22}$ and $K_{33}$ are elastic force constants corresponding to splay, twist and bend deformations respectively.

In the present analysis a two dimensional model will be used and so the Del operator is given by $\nabla=(\partial/\partial x, \partial/\partial v, 0)$. The director will be written as n=(cos θ, sin θ, 0) where θ is defined as the angle that the director makes with the x-direction. The elastic energy then takes the following form:

$$2W_d = K_{11}(\theta_x \sin\theta - \theta_y \cos\theta)^2 + K_{33}(\theta_y \sin\theta + \theta_x \cos\theta)^2 \quad \text{Equation 6.}$$

Note that there is no term in the twist elastic constant $K_{22}$ because only two dimensions are considered.

For the case of isotropic elastic constants where $K_{11} = K_{33} = K$, the equation 6 reduces to the much simpler form:

$$2W_d = K[\theta_x^2 + \theta_y^2] \quad \text{Equation 7}$$

This energy is minimised using the Euler-Lagrange equation which gives an expression for the torque T on the liquid crystal director:

$$T = 2\sin\theta\cos\theta(K_{11} - K_{33})(\theta_x^2 - \theta_x^2) - $$
$$2\cos2\theta(K_{11} - K_{33})(\theta_x \theta_y) - $$
$$2\cos2\theta(K_{11} - K_{33})(\theta_{xy} + \theta_{yx}) - $$
$$2\theta_{xx}(K_{11} \sin^2\theta + K_{33} \cos^2\theta) - $$
$$2\theta_{xx}(K_{11} \cos^2\theta + K_{33} \sin^2\theta)$$

Equation 8

Considering again the case of isotropic elastic constants, equation 8 reduces to equation 9 which has the form of the Laplace equation.

$$T = K[\theta_{xx} + \theta_{yy}] \quad \text{Equation 9}$$

The torque equation is solved on a rectangular mesh using a finite difference method. In this method the torque is set equal to a viscous dissipation term $\eta(\partial\theta/\partial t)$ where $\bar{h}$ corresponds to a NLC rotational viscosity. In the present analysis this step may appear to be empirical, however, such a time dependent term does result from using a full dynamic NLC continuum theory. In order to solve the torque equation on a grid of points the discretised form of the differential terms must be used.

In the case of the differentials with respect to x these are given by:

$$\theta_x = \frac{1}{2h}(\theta_{i+1,j} - \theta_{i-1,j})$$

$$\theta_{xx} = \frac{1}{h^2}(\theta_{i+1,j} + \theta_{i-1,j} - 2\theta_{i,j})$$

$$\theta_{xy} = \theta_{yx}$$

$$= \frac{1}{4h^2}(\theta_{i+1,j+1} + \theta_{i-1,j-1} - \theta_{i-1,j+1} - \theta_{i+1,j-1})$$

Equations 10 where $\theta_{i,j}$ denotes the value of θ at the point on the grid with the position (i,j) and h is the spacing between the grid points in both the x and y-directions. The procedure is then to calculate a value for the torque at each point on the solution grid. The new values of $\theta_{i,j}$ are then calculated across the whole grid using the following expansion of $\bar{\lambda}\theta_{i,j}$.

$$\Delta\theta_{i,j} = \theta_{i,j}^{t+\Delta t} - \theta_{i,j}^t = \left(\frac{d\theta_{i,j}}{dt}\right)_t \Delta t \quad \text{Equation 11}$$

where $\bar{\lambda}t$ is the time step between the iterations. The term $(d\theta/dt)_t$ is equal to value of the torque at each grid point at time t divided by the viscosity η.

The new values of $\square_{i,j}$ which are generated using equation 11 are then used in the next iterative step. The value of the time step was chosen so that $\overline{\lambda}t,K/\overline{h}h$ was between 0.05 and 0.2. For typical parameters of nematic liquid crystals this gives a time step $\overline{\lambda}t$ of the order of microseconds.

Results of the Finite Element Modelling

Some results of the computer simulation are now presented for the geometry shown in FIG. 7. A grid of 25 points in both the x- and y-directions was used with h=w and w/d=0.33 for the rectangular outcrop. In the current simulation isotropic elastic constants were assumed. so $K_{11}$= $K_{33}$=K. However, the computer model allows them to be different if necessary. Two different alignments over the relief structure have been considered.

Figure 8:
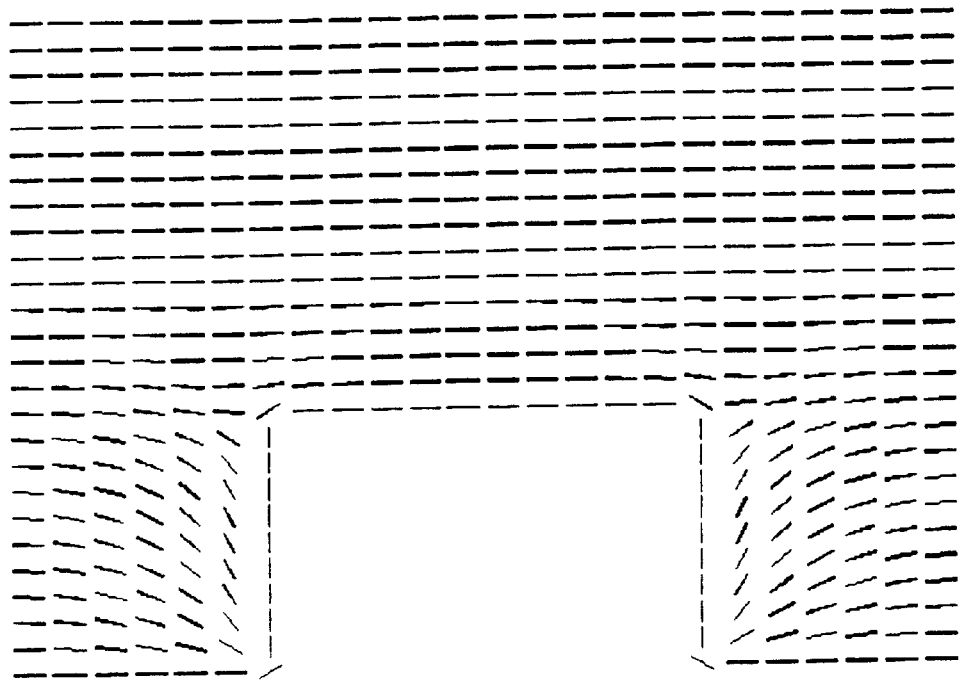
FIG. 8 shows the calculated director field for planar alignment of liquid material over the device shown in FIG. 8.

In the first case a planar alignment is assumed in which the NLC director is parallel to the surface and therefore follows the shape of the relief structure. The calculated director profile for this is shown in FIG. 8.

Figure 9:
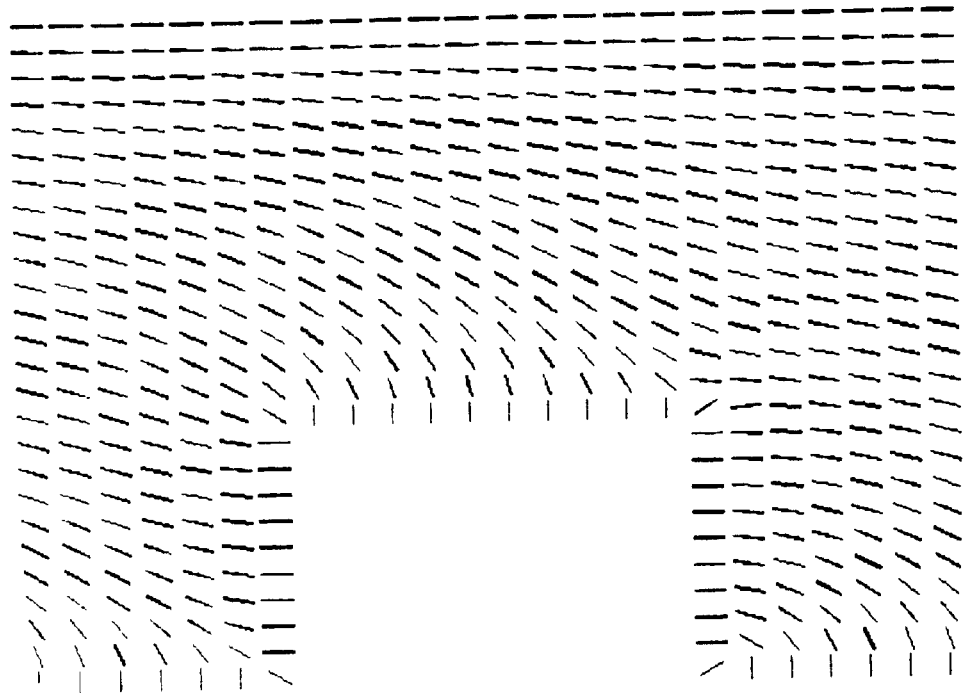
FIG. 9 shows the calculated director field for homeotropic alignment of liquid material over the device shown in FIG. 8.

In the second case homeotropic alignment at the surface is assumed, where the NLC director is perpendicular to the surface at all points. A surface treated with the chemical lecithin is one way of achieving this alignment. The calculated director profile is shown in FIG. 9.

In both cases the NLC director has been set parallel to the surface at the upper plate.

The main difference in the calculated director profiles is that with the planar surface treatment, a symmetrical profile has been obtained, but with the homeotropic treatment the profile is not symmetrical about the rectangular outcrop. The asymmetry is entirely expected for a hybrid cell in which there is planar alignment on one surface and homeotropic alignment on the other surface. In FIG. 9 there is little distortion in the region between the top of the outcrop and the upper plate because the alignment direction is the same for both. The distortion in this case is very localised in the region at the edges of the outcrop.

The effective refractive index across the width of the device has been calculated in order to demonstrate the effect of the distortion in the liquid crystal layer on the optical properties. The refractive index along the director was set as $n_{para}$=1.65 and the value perpendicular to the director was set as $n_{perp}$=1.5. It was assumed that the incident light was plane polarised parallel to the upper surface. This means that, for a director tilted at an angle $\square$ to this direction, the effective refractive index is given by:

$$n_{eff} = \frac{n_{perp} n_{para}}{\sqrt{n_{perp}^2 \cos^2\theta + n_{para}^2 \sin^2\theta}} \quad \text{Equation 12}$$

Figure 10:
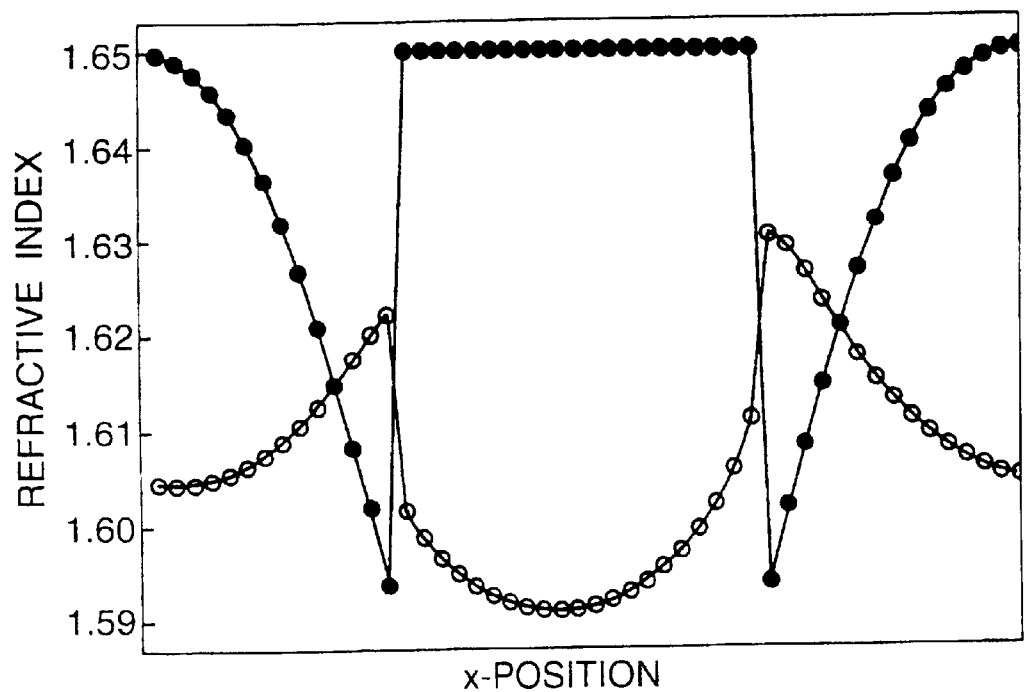
FIG. 10 shows the averaged refractive index at different positions in the device of FIG. 8 for the director profiles shown in FIGS. 9 and 10.

Using a geometrical optics approximation the refractive index for a slice through the device is calculated by averaging the refractive indices at all the positions on the grid in that layer. The results of this calculation are shown in FIG. 10 where the filled circles are from the director profile in FIG. 9 and the open circles are from the calculated director profile in FIG. 10.

Figure 11:
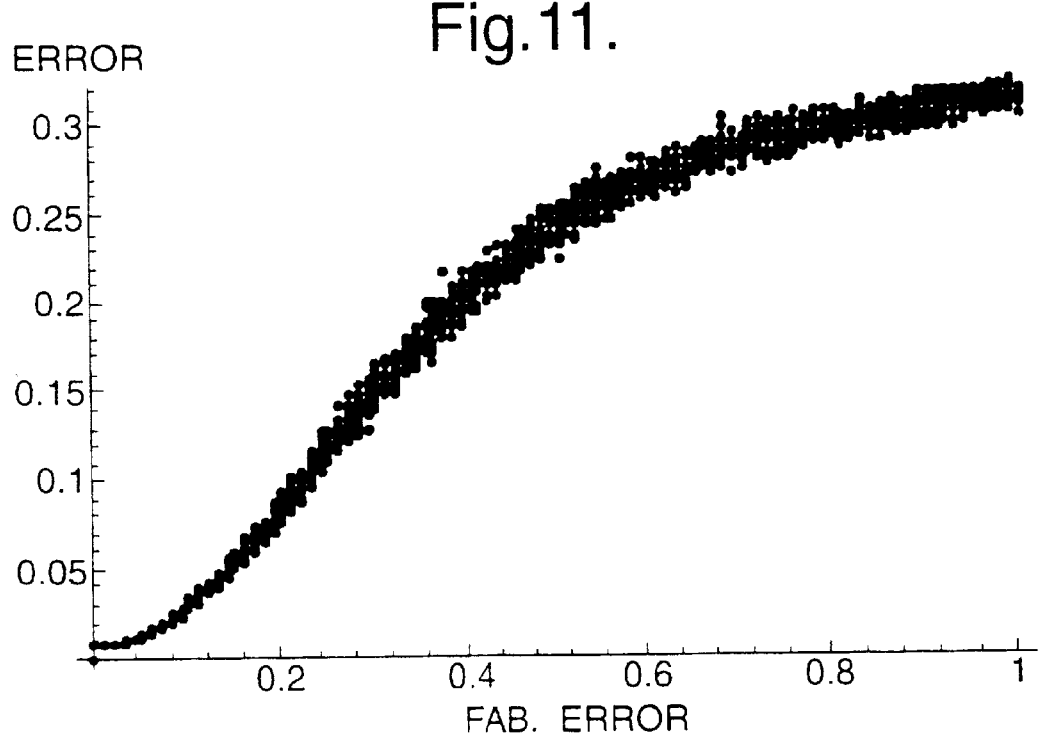
FIG. 11 shows the variation of optical output error as a function of the standard deviation of pixel depth error (normal distribution), for a 128×128 pixel array device designed to give two outputs.

From FIG. 11 it can be seen that the case of planar alignment over the relief structure gives a sudden change in the refractive index at the edges of the structure. The refractive index profile is symmetrical as would be expected from the symmetry of the director profile.

In the case of homeotropic alignment the change is more gradual at the edges. However, the refractive index continuously changes across the width of the device which can be a disadvantage for replay of the hologram.

Effect of Electric Fields

When a voltage is applied across the two sides of the device the refractive index change from the zero field to the switched state above the surface structure must give the correct phase difference to allow successful operation of the device. Obviously the largest refractive index change that can be achieved is for the planar surface treatment with a NLC of negative dielectric anisotropy (due to the larger dielectric permittivity along n than perpendicular to n).

Assume that the relief structure is coated with a conducting layer (FIG. 7b. Configuration 1) and so the voltage is applied between the surface of the relief structure and the top plate. At the edges of the structure the equipotentials will be much closer together than near the flat regions of the surface. Therefore the large fringing fields at the edge of the outcrop can cause switching of the NLC before other regions. This problem is exacerbated by the dielectric anisotropy of the NLC which means that the switched NLC regions give rise to an even more non-uniform field profile.

The modelling task will continue to allow the self-consistent calculation of the NLC distortion profile in an electric field. This will require the simultaneous solution of Poisson's equation for the potential profile and the nematic continuum equations.

Thus a simple model which gives the distortion profile of a nematic liquid crystal has been implemented which considers the worst extremes in the device parameters. The case of planar and homeotropic surface treatments over the surface relief structure have been considered and the influence of these on the refractive index profile of the device. It has been shown for these alignments that there is a large distortion field generated in the NLC when the dimensions (horizontal and vertical) of the surface relief structure become comparable with the device width.

These effects must be taken into account when encoding the desired output wave data in a device with these alignments.

The ideal case would be for planar alignment on the surfaces of the relief structure and homeotropic alignment at the edges. In a 2d profile there would then be no distortion of the NLC at zero field and the NLC would behave as if the surface relief structure were not there. However, this may not be practically realisable with current surface treatment techniques. It must also be remembered that the substrate has a three dimensional surface structure and so even if ideal alignment is achieved on two opposite sides of a rectangular out-crop it may be at the expense of poor or non-ideal alignment on the other two faces.

It must be emphasised that the effects of surface alignment and a non-uniform electric field profile will become most significant only when the dimensions of the surface relief structure are such that the depth of the surface structure is a significant fraction of the device thickness and the feature size in the plane of the surface becomes of the order of the cell thickness. If this is the case, novel alignment techniques may need to be employed and simulated NLC distortion profiles will need to be included in the substrate optimisation process.

Fabrication Errors

The fabrication process is likely to introduce a range of imperfections. Such 'errors' will increase with resolution, aspect ratio, and the number of levels used in the device. The higher the SBWP, the more information that has to be encoded, and the device becomes more difficult to realise. Several classes of deviations from the ideal, and their effects, are discussed below.

As in the liquid crystal effects section, in some cases a thorough knowledge of the errors introduced in the fabrication process enables their effects to be precompensated for at the substrate profile optimisation stage. This approach is still being investigated, but is likely to be limited to deterministic errors, as opposed to stochastic (random) effects.

Random (Space Variant) Etch Depth Errors

In these studies, the actual depths assumed to be present in the substrate were taken to be the design depth plus a random statistical variation from pixel to pixel. Such space variant errors can approximate those found in a reactive ion etching process used to fabricate the substrate, for example.

FIG. 11 shows the total variation in output error (measured a summed deviation from the design wavefronts), for a two wavefront ($n_{patterns}=2$) array, in a Fourier optical configuration. This error is plotted as a function of the standard deviation of a normally distributed depth error. A gradual falloff in performance is observed.

If the corresponding wavefronts are examined, the output associated with higher control voltage of the two is seen to degrade fastest.

Space Invariant Etch Depth Errors

Here the etch depth errors deviate uniformly across the array substrate. It is possible to partially compensate for the effect of this by 'tuning' the array—adjusting the voltage across the device to compensate for the errors.

Errors in Etch Profile Shape

Etch errors or non ideal electric field distributions can both lead to an effective form error in the shape of the device pixels. Their profile can change from rectangular to being more rounded, for example. A simple way of modelling such effects is to convolve the rectangular profile with some spread function. If the spread function is correctly deduced (perhaps by deconvolution of measured profiles), then Fourier techniques can be used to determine likely array performance degradation.

Figure 12:
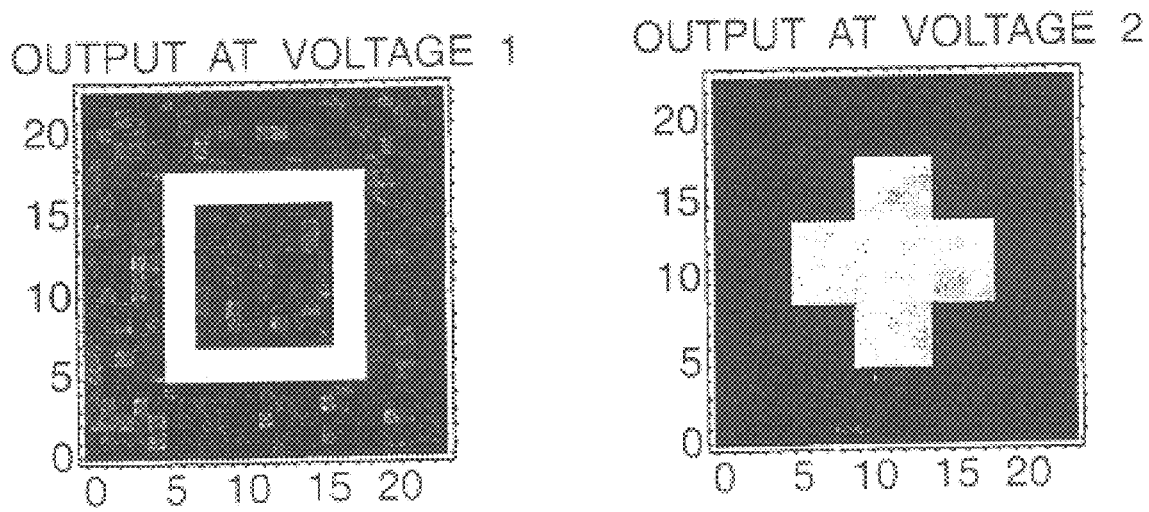

FIG. 12 shows the output patterns for two voltages for an actual device of the current invention, fabricated according to the schematic design of FIG. 3, and FIG. 13 shows the results of such a calculation to determine performance degradation. Items 9a–9d show various examples of degraded profiles and items 10a–10d respectively show, for both voltages the output patterns associated with these profiles.

For the form of the profiles illustrated, the patterns produced by this Fourier device degrade at the edges, relative to the centre (on the optical axis). Even with a large degree of profile error, the outputs of the device are still discernible (item 10d).

I claim:

1. An active hologram for generating a plurality of modified wavefronts comprising:

at least two layers of material capable of modulating radiation;

means for applying a plurality of voltages to said layers; and means for illuminating said layers with radiation, wherein said layers include:

at least one electro optic layer, having an index of refraction which changes with applied voltage so that the modulation imparted to illuminating radiation passing through any point on the hologram varies with applied voltage; and at least one substrate layer, having a surface profile defined by its thickness varying across the hologram so that the modulation imparted to illuminating radiation at a given applied voltage varies across the hologram, the profile of said substrate layer being arranged so as to define the wavefront generated at each of said plurality of applied voltages upon illumination.

2. The apparatus of claim 1 where the electro optic layer is a nematic liquid crystal.

3. The apparatus of claim 2 where the substrate layer comprises an array of pixels of varying thickness, arranged to produce a substrate surface profile which varies according to the thickness of each pixel.

4. The apparatus of claim 3 where the pixels are integral in a single substrate sheet having a surface profile which varies according to the substrate layer thickness associated with each pixel.

5. The apparatus of claim 4 where the means for applying a plurality of voltages to the layers comprises at least two electrodes arranged to facilitate application of said voltages across at least the nematic liquid crystal layer of the hologram.

6. The apparatus of claim 5 where each of the electrodes is independently formed from indium tin oxide or aluminium.

* * * * *